US011269778B1

(12) United States Patent
 Kanteti

(10) Patent No.: US 11,269,778 B1
(45) Date of Patent: Mar. 8, 2022

(54) MAPPING SUPPORTING NON-SEQUENTIAL WRITES AT SEQUENTIALLY-WRITTEN MEMORY DEVICES

(71) Applicant: Micron Technology, Inc., Boise, ID (US)

(72) Inventor: Kumar VKH Kanteti, Sunnyvale, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/949,850

(22) Filed: Nov. 17, 2020

(51) Int. Cl.
| *G06F 12/0873* | (2016.01) |
| *G06F 12/0804* | (2016.01) |
| *G06F 12/0862* | (2016.01) |
| *G06F 13/16* | (2006.01) |
| *G06F 9/448* | (2018.01) |
| *G06F 12/02* | (2006.01) |

(52) U.S. Cl.
CPC ........ *G06F 12/0873* (2013.01); *G06F 9/4498* (2018.02); *G06F 12/0246* (2013.01); *G06F 12/0804* (2013.01); *G06F 12/0862* (2013.01); *G06F 13/1673* (2013.01); *G06F 2212/7201* (2013.01)

(58) Field of Classification Search
CPC ............. G06F 12/0873; G06F 12/0862; G06F 12/0246; G06F 12/0804; G06F 13/1673; G06F 9/4498; G06F 2212/7201
See application file for complete search history.

(56) References Cited

U.S. PATENT DOCUMENTS

| 7,594,085 | B1* | 9/2009 | Rao | G06F 11/1471 |
| | | | | 707/999.202 |
| 9,836,232 | B1* | 12/2017 | Vasquez | G06F 12/0804 |
| 2012/0278664 | A1* | 11/2012 | Kazui | G06F 3/061 |
| | | | | 714/48 |
| 2016/0283498 | A1* | 9/2016 | Beaverson | G06F 16/137 |
| 2016/0342509 | A1* | 11/2016 | Kotte | G06F 12/0246 |
| 2020/0226069 | A1* | 7/2020 | Kaburaki | G06F 3/0604 |

\* cited by examiner

*Primary Examiner* — Tasnima Matin
(74) *Attorney, Agent, or Firm* — Lowenstein Sandler LLP

(57) ABSTRACT

A system comprising integrated circuit (IC) dice having memory cells and a processing device coupled to the IC dice. The processing device to perform operations including: intercepting an input/output (IO) write request directed at the IC dice; causing a device mapping logic to enter an initial state associated with a first group of memory cells of the IC dice; caching a write pointer that includes a location within the first group of memory cells; transitioning the device mapping logic from the initial state to a sequential IO state; and, in response to determining the IO write request is directed to the location of the write pointer, causing data associated with the IO write request to be sequentially written to IC dice starting at the location of the write pointer.

20 Claims, 9 Drawing Sheets

MAPPING SUPPORTING NON-SEQUENTIAL WRITES AT SEQUENTIALLY-WRITTEN MEMORY DEVICES

TECHNICAL FIELD

Embodiments of the disclosure relate generally to memory sub-systems, and more specifically, related to mapping supporting non-sequential writes at sequentially-written memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
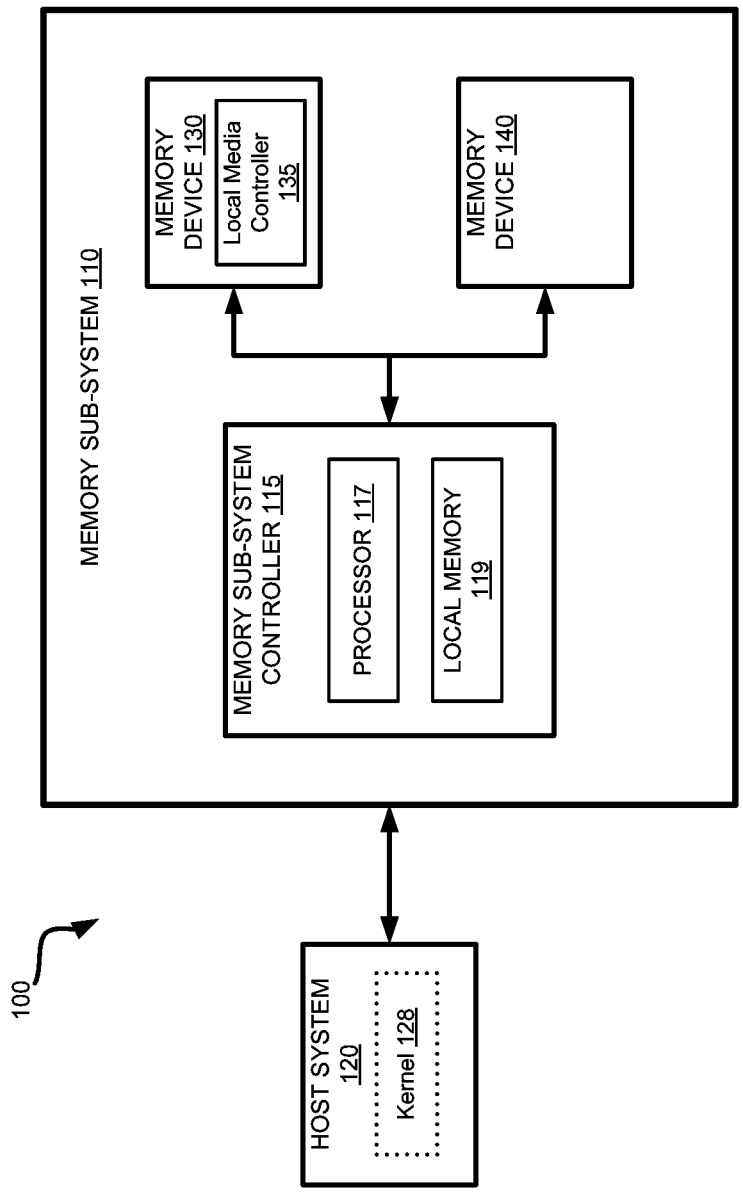
FIG. 1A illustrates an example computing system that includes a memory sub-system according to embodiments.

Aspects of the present disclosure are directed to mapping supporting non-sequential writes at sequentially-written memory devices. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

The memory sub-system can include multiple components, such as memory devices that can store data from the host system in storage media, e.g., integrated circuit (IC) dies having addressable memory cells that individually store the data. Processing in certain memory sub-systems today is generally performed with random allocations to the IC dies and in small increments of data, e.g., four kilobytes (KB). These random allocations of a page or a block of data include non-sequential and/or random writes to the IC dies. This practice results in high costs in memory, e.g., dynamic random access memory (DRAM), static random access memory (SRAM), or persistent memory, for storing mapping data structures that track logical-to-physical (LTP) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snap-shotting and logging is done to persist the mapping data structures across shutdowns and surprise power failure situations. This adds additional write overhead to the IC dies and performance loss.

Storage stacks are in the process of being modified to take advantage of sequential IO memory device efficiencies. For example, storage stacks included in file systems group data by locality (e.g., according to thread, process, or application) and write the data sequentially to storage devices. File systems can then write data of different localities as parallel sequential streams to storage devices, each stream having its own locality. Reference to locality can be reference to either temporal locality or spatial locality. Data having temporal locality is data that a processor tends to access at the same memory locations repetitively over a short period of time, e.g., data written, over-written, and trimmed around the same time. Data having spatial locality captures the tendency that when a storage device references a particular storage location at a particular time, then the storage device is likely to reference nearby memory locations in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array.

When data having locality are written sequentially, the data are written to groups of memory cells that are also referred to as zones for simplicity, where each zone can store multiple physical blocks of data. Thus, mapping can be recorded at a higher granularity (megabytes instead of kilobytes) in order to map a particular data group as a zone in the LBA space, which significantly reduces metadata that is logged. The mapping space associated the LBA space at this granularity can be referred to as zoned namespace (ZNS). In one example, a data group is made up of multiple blocks of data having locality, where each data block corresponds to a physical block (e.g., erase unit) of the IC dies. In one embodiment, the physical block (or erase unit) of a memory device is around 100 megabytes (MB) in size. The groups of memory cells (or zones) can be at least two to four times (or more) the size of the physical block. Accordingly, the zones can store at least 400 MB of data (e.g., 400 MB, 500 MB, 600 MB, or more), each of which is significantly larger than four kilobytes (KB).

Copy-on-write (COW) management of storage devices is generally best suited for sequential writing because, once data is written, the data is not overwritten. More specifically, COW is a resource-management technique in computer programming to efficiently implement a duplicate or copy operation on modifiable resources in memory. If a resource is duplicated but not modified, it is not necessary to create a new resource; the resource can be shared between the copy and the original. Where a file system writes to a storage device sequentially, it is more efficient to do so using COW management. Even in a COW file system, however, some non-sequential IO write operations are necessary, e.g., by performing a write-in-place operation. Thus, in certain systems, the management of sequential IO, and occasional non-sequential IO, write operations (or requests) to storage devices occurs within a memory sub-system controller, e.g., which acts as an intermediary between the COW file system of the host and the storage device. Management within the memory sub-system controller adds a level of complexity, including LTP address mapping, logging metadata, and corresponding resource requirements for handling non-sequential IO writes despite the majority of the IO writes being sequential write operations.

At least some aspects of the present disclosure address the above and other deficiencies through configuring the host system (e.g., the kernel of the host) with device mapping capabilities and with exposure to the characteristics of sequential IO writes and corresponding physical addresses of the storage device. The device mapping capabilities can include a device mapping logic (such as state machine) that can direct sequential IO write requests to the IC dice of the main storage device when the write requests are directed to a cached write pointer (WP) that keeps track of the sequential location of writing within the IC dice. These sequential IO write requests can directly cause associated data to be written within the IC dice at the WP, e.g., without having to be managed by the memory sub-system controller. The device mapping logic can also, when in an initial state associated with a first group of memory cells (or first zone), allocate a chunk of memory in a non-volatile memory (NVM) buffer, e.g., located within a small storage device, which can help support buffering data for handling any non-sequential IO write requests. While the main storage device is written to sequentially using COW management, this small storage device can aid in handling non-sequential (or random) IO write requests.

In various embodiments, when an IO write request to the first group of memory cells is non-sequential (in not being directed to the current location of the WP), then the host system transitions the device mapping logic from a sequential IO state to one of a non-sequential write state (when the request is to a target address that is greater than an address of the WP) or a pre-fetch state (when the request is to a target address that is less than the address of the WP). In the non-sequential write state, the host system can cause data associated with the non-sequential IO write request, and associated with IO write requests directed to a remainder of unwritten memory cells of the first group of memory cells, to be written to the allocated memory of the NVM buffer. In the pre-fetch state, the host system can cause the data associated with the non-sequential IO write request, and that has already been written from a beginning of the first group of memory cells, to be written to the allocated memory of the NVM buffer.

Once the host system completes handling of the non-sequential IO write request(s) directed at the first group of memory cells, the host system can transition the device mapping logic from the non-sequential write state (or the pre-fetch state) to a reclaim state. In the reclaim state, the host system can direct the buffered data in the NVM buffer to be sequentially written to the first group of memory cells with the IC dice of the main storage device. The host system can further transition the device mapping logic from the reclaim state to a free state, in which the host system can free the allocated memory within the NVM buffer associated with the first group of memory cells. In this way, with using of a small NVM device and device mapping logic, data associated with non-sequential IO write requests can be buffered while waiting to be written sequentially to the associated group of memory cells (or zone) of the IC dice.

Advantages of the present disclosure include but are not limited to significant mapping overhead reduction within the memory sub-system by enabling the host system to track logical block numbers (LBN) that are sequentially written to the groups of memory cells (or zones), and that can maintain limited mapping entries for LBNs that have memory allocations within the NVM buffer of the small storage device. Once a zone is filled up and deactivated, these mapping entries are no longer needed because the memory allocations are freed up for other active zones. The logging of the zone mapping data structure employed by the host system are eliminated where the mapping data structure is stored in the NVM buffer, reserving storage and memory resources for other system purposes. Other advantages will be apparent to those skilled in the art of memory allocation and mapping to storage devices discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

The computing system 100 includes a kernel 128 in the host system 120 that is configured with device mapping and tracking functionality discussed herein throughout the Figures. In some embodiments, the host system 120 includes at least a portion of the device mapping and tracking functionality. In other embodiments, or in combination, the controller 115 and/or a processing device of the host system 120 includes at least a portion of the device mapping and tracking functionality. For example, the controller and the processing device (processor) of the host system 120 can be configured to execute instructions stored in memory for performing the operations of the mapping and tracking functionality described herein.

Figure 1B:
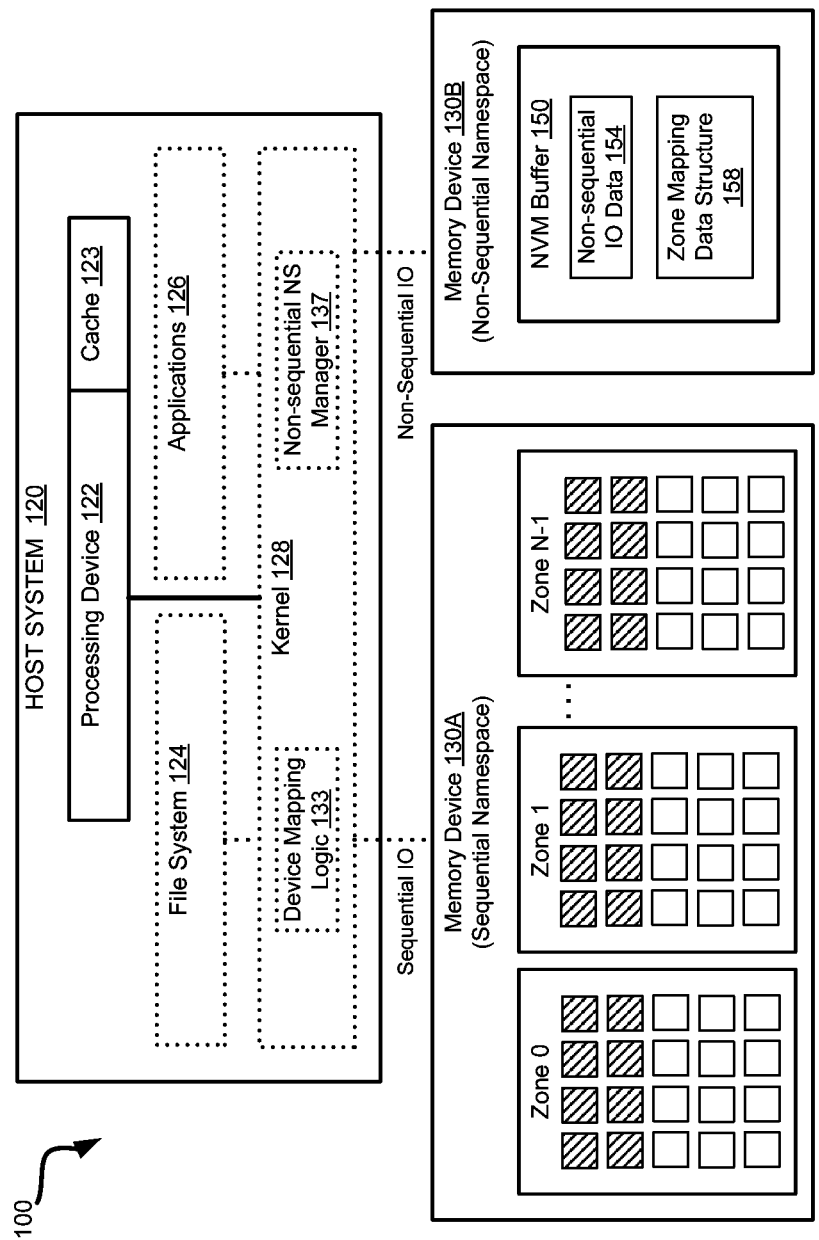
FIG. 1B is a detailed block diagram of the computing system of FIG. 1A according to some embodiments.

FIG. 1B is a detailed block diagram of the computing system 100 of FIG. 1A according to some embodiments. In various embodiments, the host system 120 can further include a processing device 122, a cache 123, a file system 124 (e.g., a host file system), one or more applications 126, and a kernel 128 including device mapping logic 133 and non-sequential namespace (NS) manager 137. In embodiments, the processing device 122 performs instructions to execute the kernel 128, e.g., a kernel of an operating system of the host system 120. The file system 124 and the applications 126 can run on the kernel 128, which can be viewed as the controller of the operating system. Thus, IO requests (whether write or read operations) initiated by the file system 124 or an application 126 can be intercepted (or otherwise detected) and handled by the kernel 128, as will be discussed in detail.

In various embodiments, the computing system 100 includes a memory device 130A associated with sequential namespace (e.g., ZNS) and a memory device 130B associated with non-sequential namespace (e.g., random NS). In one embodiment, the memory device 130A is a Zoned Namespace (ZNS) solid state device that implements the Zoned Namespace Command Set as defined by the NVM Express™ (NVMe™) organization. The memory device 130A can be the storage device previously referred to that includes multiple IC dice. Writing sequentially to the zones (e.g., Zone 0, Zone 1, . . . Zone N–1) is generally performed sequentially from the top (or smallest addresses) of the IC dice to the bottom (or largest addresses) of the IC dice, which is illustrated by the patterned blocks of data already written to the illustrated zones. In these embodiments, the kernel 128 tracks logical block numbers (or addresses) of LBA space to the zoned namespace of the memory device 130A by sequential relationship, e.g., by being programmed to have access to the sequential physical addresses of the zones (or groups of memory cells) within the multiple IC dice of memory device 130A. A write pointer (WP) to the zones of the memory device 130A can be stored in the cache 123 and readily accessed to determine whether an intercepted IO write request is directed to the WP, and thus is sequential, or is not directed to the WP, and is thus non-sequential.

The memory device 130B can be a small storage device, as previously mentioned, which can be significantly smaller than the memory device 130A and adapted with a NVM buffer 150. The NVM buffer 150 can store non-sequential IO data 154, as managed by the non-sequential NS manager 137, and a zone mapping data structure 158. The non-sequential NS manager 137 can thus handle updating of the zone mapping data structure 158 and other administration with reference to non-sequential IO write requests. The zone mapping data structure 158 can be a logical-to-physical (LTP) mapping data structure to map the logical block numbers (or addresses) of LBA space to memory chunks in the NVM buffer 1545 that are allocated to individual zones or groups of memory cells for handling non-sequential IO write requests, as will be discussed in more detail.

Figure 2:
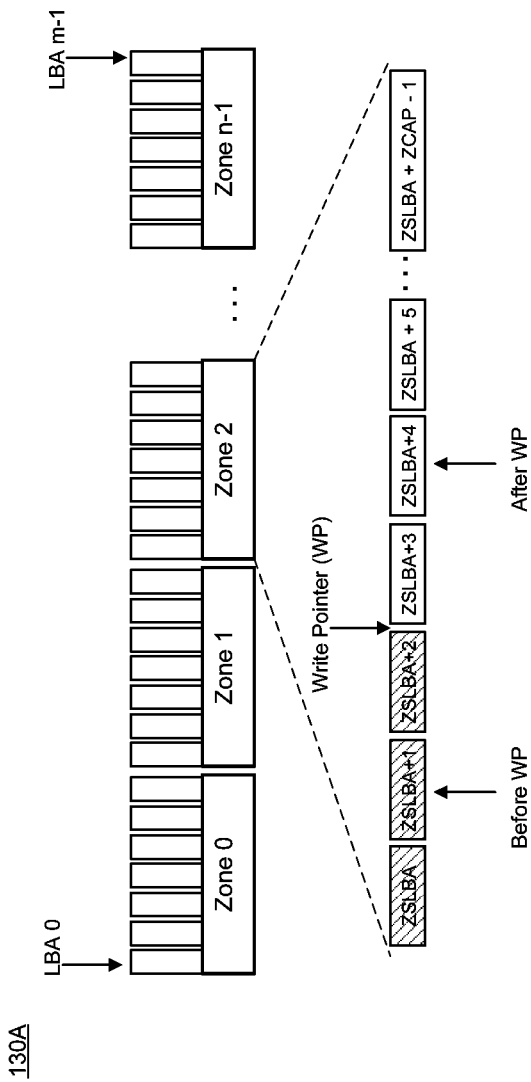
FIG. 2 is a schematic diagram that illustrates use of a write pointer (WP) to gauge whether to write to zones sequentially according to various embodiments.

FIG. 2 is a schematic diagram that illustrates use of the write pointer (WP) to gauge whether to write to zones sequentially according to various embodiments. The illustrated zones (Zone 0, Zone 1, Zone 2 . . . Zone n–1) can be understood to be part of the memory device 130A discussed with reference to FIG. 1B. The LBA address range can be ordered in these zones, e.g., from zero ("0") at the beginning and sequentially written to the zones through LBA m–1 at the end of Zone n–1. By way of example, and for explanatory purposes only, the memory cells of Zone 2 are illustrated in more detail. Each zone can be composed of multiple block-sized groups of cells, where each physical block is broken into smaller pages, blocks, or units of memory cells of between 4 KB and 16 KB each. The granularity of 100 MB discussed previously is not necessary here where the kernel 128 can directly write to the groups of cells without the overhead of detailed zone mapping data structures (that are maintained for all groups of cells) and without logging.

As illustrated, therefore, the first units of memory cells of Zone 2 (ZSLBA, ZSBLA+1, and ZSLBA+2) have been written (or programmed) already, and thus are shaded with a pattern. A number of additional units of memory cells have not been written and are thus not shaded, all the way through and to include a final unit, which is labeled as ZSLBA+ZCAP-1. The WP for writing to the memory device 120A is illustrated as being located at the beginning of the unwritten blocks within Zone 2, where Zone 2 is the "active" zone currently being programmed.

In various embodiments, when an IO write request is directed at an address at the location of the WP, the data associated with the IO write request is to be sequentially written from the current WP. This type of behavior is the expected behavior the majority of the time under the COW management of the memory device 130A. If, however, the IO write request is directed to a target address that is not at the WP, this is a non-sequential (or random) IO write request. In one embodiment, the target address is greater than the address of the location of the WP, and thus can be said to be "After the WP" from a sequential ordering perspective. In another embodiment, the target address is less than the address of the location of the WP, and thus can be said to be "Before the WP" from a sequential ordering perspective. Once an IO write request is directed to a new zone, this transition in zone causes a reset in the WP, which transitions to the new zone.

Figure 3:
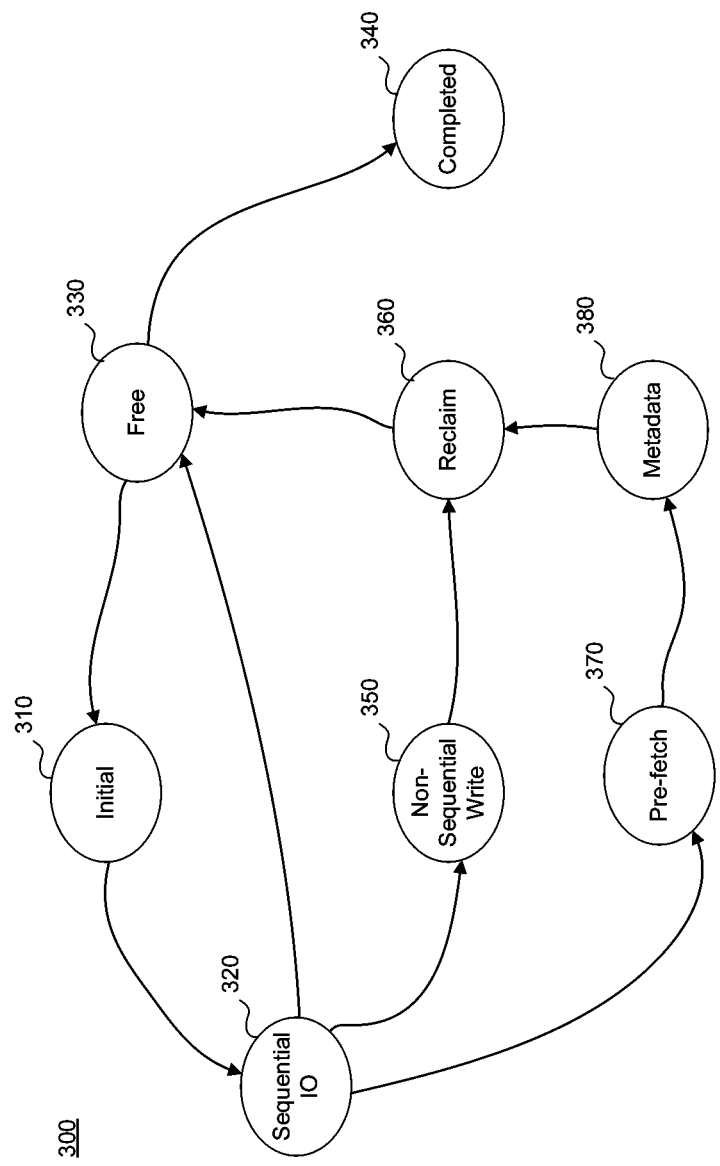
FIG. 3 is a flow diagram that illustrates an example of a device mapping logic according to some embodiments.

FIG. 3 is a flow diagram that illustrates an example of a device mapping logic 300 according to some embodiments. For example, the device mapping logic 300 can be the same or complementary to the device mapping logic 133 of FIG. 1B. While different types of logic are envisioned, the device mapping logic 300 can be implemented as a state machine containing multiple states such as those illustrated in FIG. 3. In various embodiments, the states in which the kernel 128 operates the device mapping logic 300 depends on IO write requests intercepted by the kernel 128. The design of the device mapping logic 300 can be intended to minimize the number of IO requests directed at the IC dice of the memory device 130A and to effectively convert non-sequential (or random) IO write requests to sequential IO write requests.

In various embodiments, the device mapping logic 300 can enter an initial state 310 upon the kernel 128 intercepting a first IO write request to a specific group of memory cells, e.g., Zone 2 with reference to FIG. 2. The functioning of the device mapping logic 300 can then be with reference to that specific zone until the zone is freed. In the initial state 310, the kernel 128 can allocate and bring up-to-date, in-memory data structures, to include the zone mapping data structure 158 (FIG. 1B). The kernel 128 can also issue a report with a zone number to query zone information. The kernel 128 can further store, in the cache 123, the write pointer (WP), which includes a location within the group of memory cells. An address of this WP can then be used to determine whether a subsequent IO write request is sequential or not. Further, in the initial state 310, the kernel 128 can allocate memory within the NVM buffer 150 for the specific zone, to thus handle any non-sequential IO write requests, as will be discussed.

In these embodiments, the kernel 128 transitions the device mapping logic 300 to a sequential IO state 320, where the kernel 128 processes IO write requests so long as they are directed to the location of the current WP, which is cached. In other words, if the IO write requests are directed to the location of the current WP, the IO write requests are said to be sequential. The kernel 128 (or file system 124 or application 126 executing on top of the kernel 128) can directly send the sequential IO write requests to the memory device 130A, causing their data to be sequentially written starting at the current WP location. Upon completion of each sequential IO write request to the specific zone, the kernel 128 can update the location of the write pointer in the cache 123.

In some embodiments, in response to a subsequent IO write request being directed to a second group of memory cells (e.g., another zone such as Zone 3 in FIG. 2), the kernel 128 can transition the device mapping logic 300 from the sequential IO state 320 to a free state 330. The fact that the subsequent IO write request is directed outside of the specific zone is interpreted as the specific zone now being full, which is closed, and a sequentially-next zone can then be activated and zone resources in the kernel 128 re-provisioned to the sequentially-next zone. For example, in the free state 330, the kernel 128 can free the allocated memory within the NVM buffer 150 associated with the specific group of memory cells (e.g., Zone 2). The kernel 128 can further transition the device mapping logic from the free state 330 to a completed state 340 with reference to memory allocation for the specific group of memory cells.

While in the sequential IO state 320, however, in response to receiving a subsequent IO write request directed to target address that is greater than the address of the location of the WP (see FIG. 2), the kernel 128 can transition the device mapping logic 300 from the sequential IO state 310 to a non-sequential write state 350, e.g., a random write state. In the non-sequential write state 350, the kernel 128 can cause second data associated with the non-sequential IO write request, and with write IO requests directed to a remainder of unwritten memory cells of the specific group of memory cells (e.g., between the WP location and the end of the active zone), to be written to the allocated memory of the NVM buffer 150.

While the device mapping logic 300 is in the non-sequential write state 350, the kernel 128 can further store, to a logical-to-physical (LTP) mapping data structure, an entry that maps the second data from a logical block address (LBA) to a memory chunk in the NVM buffer 150 allocated to the specific group of memory cells. Further, in response to a read request directed at the LBA address, the kernel 128 can return data stored in the memory chunk of the NVM buffer.

The kernel 128 can further detect a non-sequential IO write request being directed to a second group of memory cells, such as to Zone 3, indicating that writing has transitioned to a new group of memory cells and that allocated memory (in the NVM buffer 150) is needed for handling of the non-sequential IO write request. In various embodiments, in response to this detection, the kernel 128 transitions the device mapping logic 300 from the non-sequential write state 350 to a reclaim state 360.

In some embodiments, in the reclaim state 360, the kernel 128 causes the second data to be sequentially written to the specific group of memory cells starting from the location of the write pointer (WP). The kernel 128 also closes the specific group of memory cells or zone to further writing. The kernel 128 can then transition the device mapping logic 300 from the reclaim state 360 to the free state 330, in which the kernel 128 can free the allocated memory within the NVM buffer 150 associated with the specific group of memory cells. These steps effectively perform a zone reset and opens the way to transitioning back to the non-sequential write state 350 or the pre-fetch state 370 associated with a new active zone.

While in the sequential IO state 320, however, in response to receiving a subsequent IO write request directed to target address that is less than the address of the location of the WP (see FIG. 2), the kernel 128 can transition the device mapping logic 300 from the sequential IO state 310 to a pre-fetch state 370. While in the pre-fetch state 370, the kernel 128 can cause second data associated with the subsequent IO write request, and that has already been written from a beginning of the specific group of memory cells, to be written to the allocated memory of the NVM buffer 150. The kernel 128 can further transition the device mapping logic from the pre-fetch state 370 to a metadata state 380. The kernel 128 can further store, to a LTP mapping data structure (such as the zone mapping data structure 158 of FIG. 1B), an entry that maps the second data from a logical block address (LBA) to a memory chunk in the NVM buffer 150 allocated to the first group of memory cells.

While in the metadata state 380, the kernel 380 can intercept an additional IO write request to the specific group of memory cells, and cause third data associated with the additional IO write request to be written to the allocated memory (e.g., the memory chunk) of the NVM buffer 150. The device mapping logic 300 can remain in the metadata state 380 until the specific group of memory cells is reclaimed.

The kernel 128 can further detect a non-sequential IO write request being directed to a second group of memory cells, such as to Zone 3, indicating that sequential writing has transitioned to a new group of memory cells and that allocated memory (in the NVM buffer 150) is needed for handling of the non-sequential IO write request. In various embodiments, in response to this detection, the kernel 128 transitions the device mapping logic 300 from the metadata state 380 to a reclaim state 360.

In various embodiments, while in the reclaim state 360, the kernel 128 causes the second data and the third data to be sequentially written to the first group of memory cells starting from the beginning of the first group of memory cells to the location of the write pointer (WP). The kernel 128 can also issue a zone reset command, to reset tracking of zone writes to a new group of memory cells. Performing reclaim operations thus closes the specific group of memory cells from further writing. The kernel 128 can then transition the device mapping logic 300 from the reclaim state 360 to the free state 330, in which the kernel 128 can free the allocated memory within the NVM buffer 150 associated with the specific group of memory cells. These steps effectively perform a zone reset and opens the way to transitioning back to the non-sequential write state 350 or the pre-fetch state 370 associated with a new active zone.

In this way, the device mapping logic 300 within the kernel 128 is triggered by different types of IO write requests, and handles each IO write request appropriately in order ensure sequential writing of data within the groups of cells of the multiple IC dice while reducing the number of IOs directed at the memory device 130A. The device mapping logic 300 helps the host system 120 to direct sequential writing of the memory device 130A while employing the memory device 130B for buffering data of non-sequential IO write requests. Once, non-sequential writing ceases for a group of memory cells, buffered data (e.g., in the NVM buffer 150) can be sequentially written to the active zone before the active zone is closed.

Figure 4:
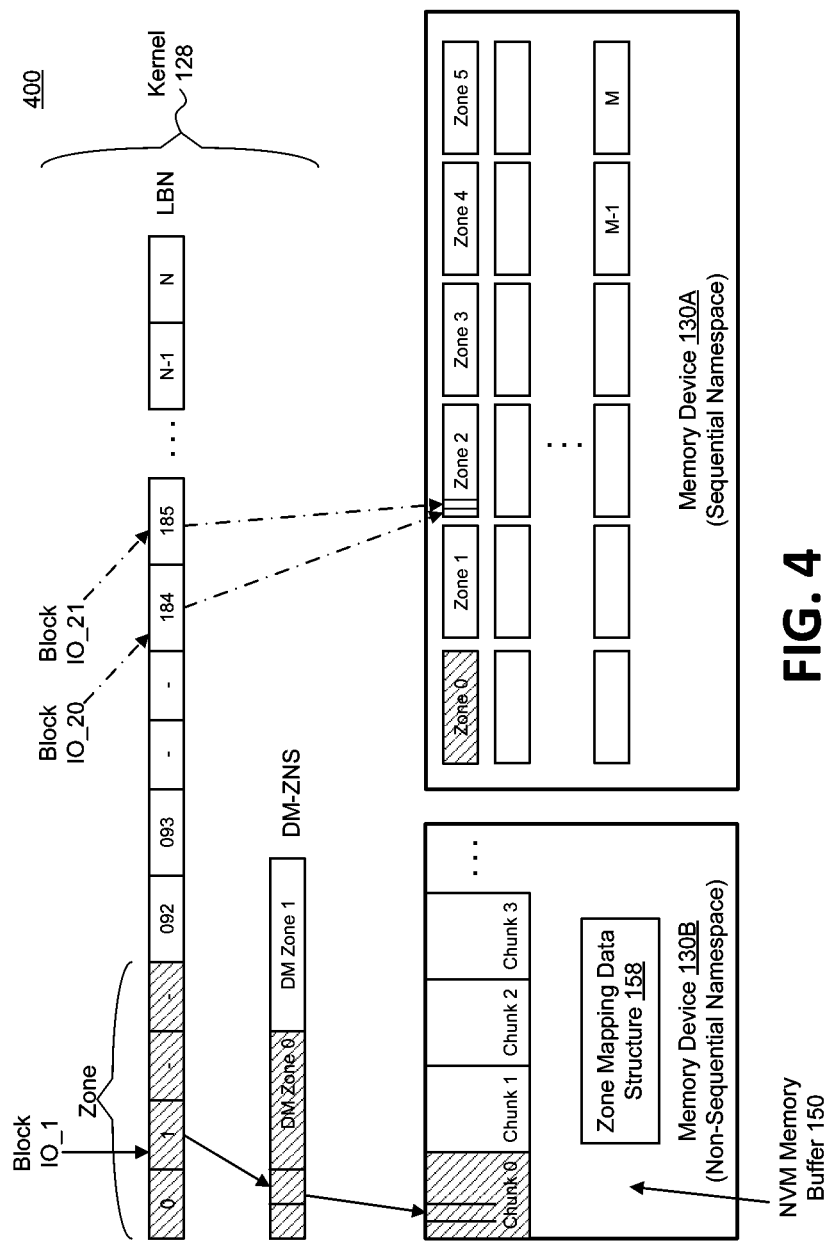
FIG. 4 is a functional schematic diagram that illustrates an example of data structures and mapping to support non-sequential writes to a sequentially-written memory device according to various embodiments.

FIG. 4 is a functional schematic diagram 400 that illustrates an example of data structures and mapping to support non-sequential writes to a sequentially-written memory device according to various embodiments. As illustrated, the zone mapping data structure 158 can be stored in the memory device 130B, which is non-sequential namespace memory. In other embodiments, the zone mapping data structure 158 can be stored or at least cached in the cache 123 of the host system 120, or stored in other non-volatile memory of the host system 120. In some embodiments, each data chunk that is allocated within the memory device 130B can be allocated to a specific group of memory cells (or zone) and can be the size of a group of memory cells, e.g., a zone. This amount of memory of the memory device 130B can be allocated in order to ensure the ability to buffer data up to and including all of the data of a zone in the memory device 130A, which can be sequentially written to that zone later.

For purposes of explanation, consider that a first zone is being written and the kernel 128 intercepts a block IO_1 write request to block_1 of a first Zone tracked within the logical block numbers (LBN) of the LBA address space. In an embodiment, the kernel 128 can correlate this first Zone as between the LBA of block IO_1 and a DM Zone 0, where DM stands for "device mapping" and is associated with the kernel 128. Assume further that the block IO_1 request is a non-sequential IO write request, and thus its data is stored in a location for the second block within Chunk 0, which is allocated to Zone 0 of the memory device 130A. Table 1 illustrates an example of a resulting state of the zone mapping data structure 158 as result.

TABLE 1

| LBN | DM Zone | Chunk | ZNS Zone |
|---|---|---|---|
| 0 . . . 091 | DM Zone 0 | Chunk 0 | Zone 0 |
| 092 . . . 183 | DM Zone 1 | Chunk 1 | Zone 1 |

Once Zone 0 is fully written and is deactivated, the kernel 128 can free Chunk 0 from allocation to Zone 0, leaving Chunk 0 to be allocated to a further zone later on that is activated. Because it is possible to concurrently write parallel streams of locality data to multiple zones (e.g., zones that are on different die of the multiple IC dice), multiple chunks of memory within the memory device 130B can be concurrently allocated to different zones. In some embodiments, if a read request or operation were to be intercepted directed at the LBA address mapped to Chunk 0, the kernel 128 can check the zone mapping data structure 158 and find an entry for the LBA address. The kernel 128 can then return, to the requesting application (or file system), data stored in the memory chunk (Chunk 0) of the NVM buffer 150. The fulfillment of the read request from the NVM buffer 150 will no longer be valid, however, once the data in Chunk 0 is sequentially written back to Zone 0 and Zone 0 is closed. Once closed, the kernel 128 further fulfills read requests directly from the physical address of Zone 0 that corresponds to LBA of block IO_1, for example.

As further explanation, further image that the kernel 128, at a later point in time when the device mapping logic 133 is in the sequential IO state 320, intercepts sequential IO write requests (e.g., block IO_20 and block IO_21), respectively directed to block 184 and block 185 of Zone 2. Because the IO write requests are sequential to the WP location, the kernel 128 can directly cause their data to be written to sequential locations from the current WP location in Zone 2, as illustrated. Any subsequent read request directed at LBAs associated with these physical blocks in Zone 2 can be fulfilled by the kernel 128 directly out of Zone 2, due to direct exposure to the physical addresses of this data.

Figure 5:
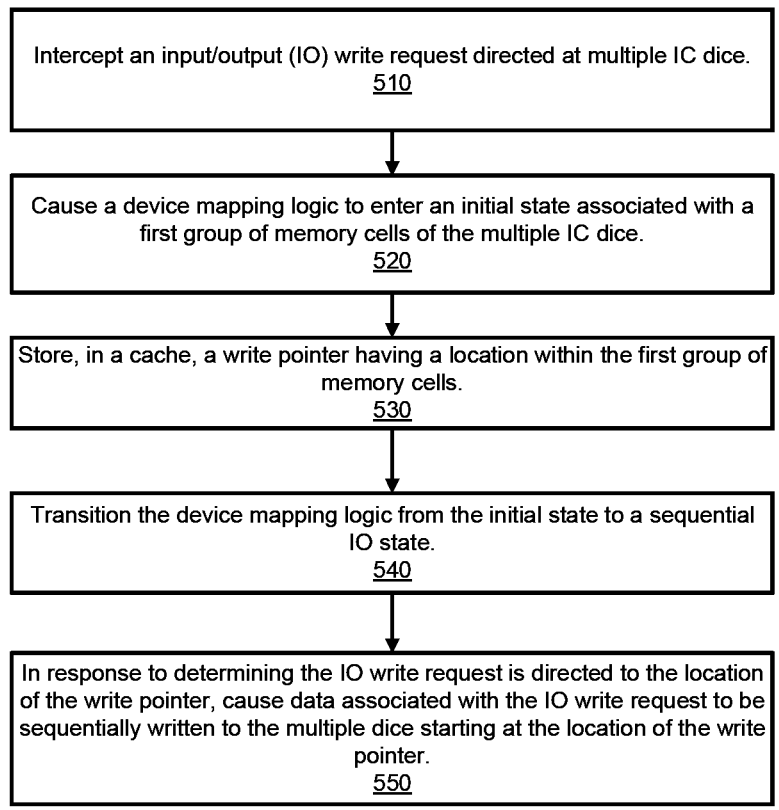
FIG. 5 is a flow chart of a method for mapping data that is sequentially written to the IC dies of the memory sub-system according to an embodiment.

FIG. 5 is a flow chart of a method 500 for mapping data that is sequentially written to the IC dies of the memory sub-system according to an embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the host system 120 (e.g., via execution of the kernel 128 by the processing device 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic intercepts an input/output (IO) write request directed at multiple IC dice, e.g., of the memory device 130A of FIG. 1A.

At operation 520, the processing logic causes a device mapping logic to enter an initial state associated with a first group of memory cells of the multiple IC dice. The initial state can be the initial state 310 of the device mapping logic 300 of FIG. 3 in one embodiment. The first group of memory cells can be a zone associated with multiple physical blocks of data capacity.

At operation 530, the processing logic stores, in a cache, a write pointer having a location within the first group of memory cells.

At operation 540, the processing logic transitions the device mapping logic from the initial state to a sequential IO state, e.g., the sequential IO state 320 discussed with reference to the device mapping logic 300 of FIG. 3.

At operation 550, the processing logic, in response to determining the IO write request is directed to the location of the write pointer, causes data associated with the IO write request to be sequentially written to the multiple IC dice starting at the location of the write pointer.

Figure 6:
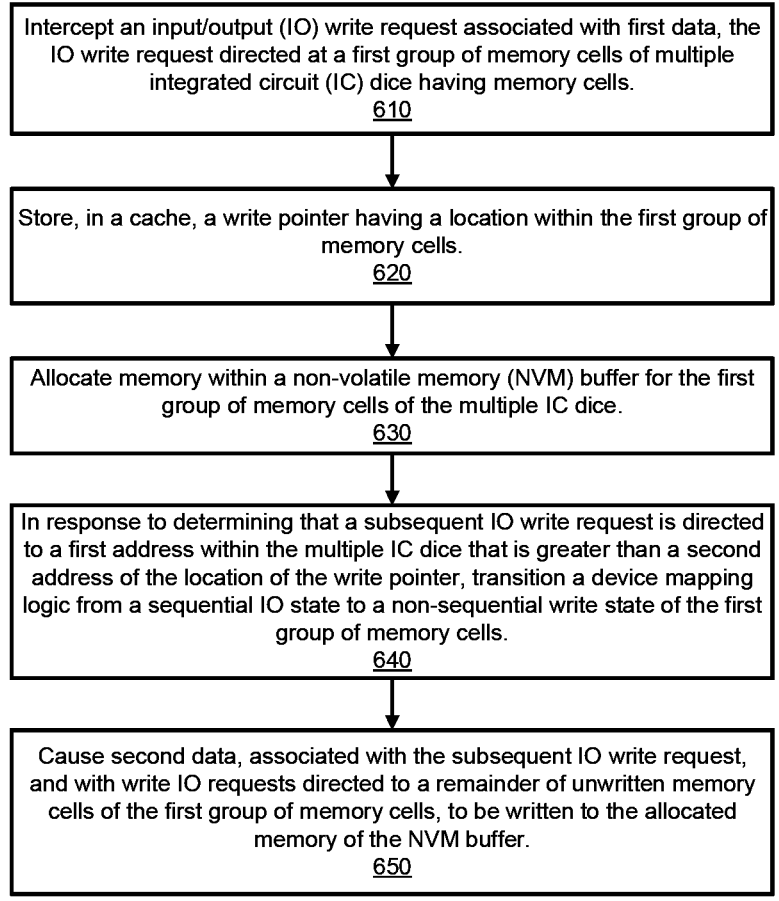
FIG. 6 is a flow chart of a method for tracking non-sequential writes to a sequentially-written memory device according to an embodiment.

FIG. 6 is a flow chart of a method 600 for tracking non-sequential writes to a sequentially-written memory device according to an embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the host system 120 (e.g., via execution of the kernel 128 by the processing device 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic intercepts an input/output (IO) write request associated with first data, the IO write request directed at a first group of memory cells of multiple integrated circuit (IC) dice having memory cells.

At operation 620, the processing logic stores, in a cache, a write pointer having a location within the first group of memory cells.

At operation 630, the processing logic allocates memory within a non-volatile memory (NVM) buffer for the first group of memory cells of the multiple IC dice. In one embodiment, the allocated memory is a memory chunk the size of the group of memory cells.

At operation 640, the processing logic, in response to determining that a subsequent IO write request is directed to a target address within the multiple IC dice that is greater than an address of the location of the write pointer, transitions a device mapping logic from a sequential IO state to a non-sequential write state associated with the first group of memory cells. The non-sequential write state can be the non-sequential write state 350 of FIG. 3, for example. The target address can be said to be "After" the location of the WP, as per FIG. 2.

At operation 650, as a furtherance of operation 640, the processing logic causes second data associated with the subsequent IO write request, and associated with IO write requests directed to a remainder of unwritten memory cells of the first group of memory cells, to be written to the allocated memory of the NVM buffer 150. Operation 650 thus enables data associated with the non-sequential IO write requests directed to the first group memory cells to be buffered in the memory device 130B. In this way, and in various embodiments, the kernel 128 is programmed with access to physical addresses of groups of memory cells of the multiple IC dice, where the kernel is to target sequential write operations and subsequent read operations to the physical addresses.

Figure 7:
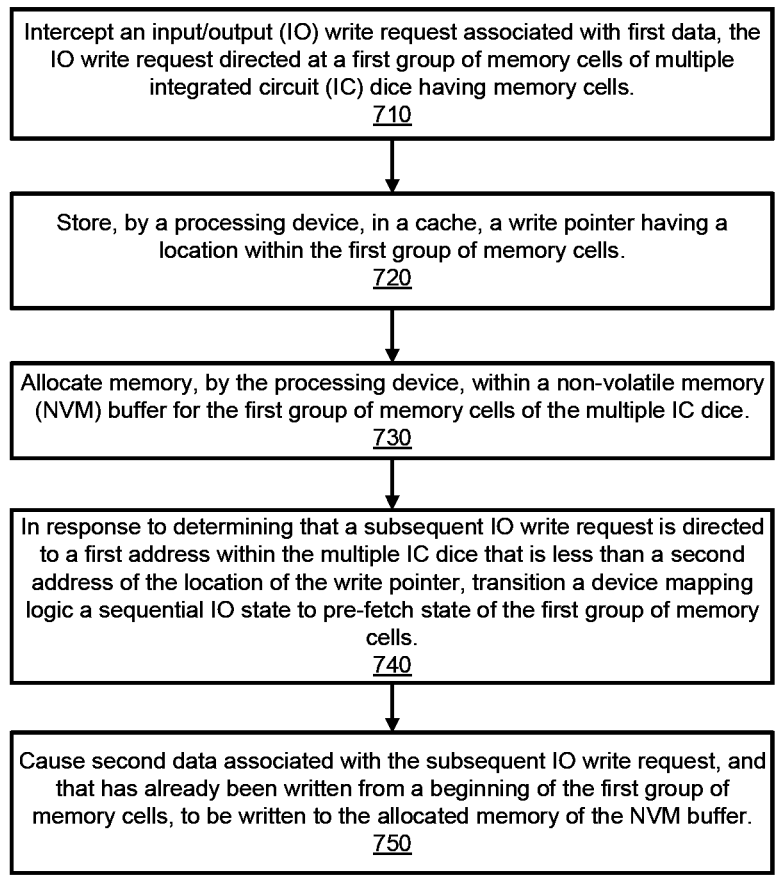
FIG. 7 is a flow chart of a method for tracking non-sequential writes to a sequentially-written memory device according to another embodiment.

FIG. 7 is a flow chart of a method 700 for tracking non-sequential writes to a sequentially-written memory device according to another embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the host system 120 (e.g., via execution of the kernel 128 by the processing device 122) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic intercepts an input/output (IO) write request associated with first data, the IO write request directed at a first group of memory cells of multiple integrated circuit (IC) dice having memory cells.

At operation 720, the processing logic stores a write pointer pointing to a location within the first group of memory cells.

At operation 730, the processing logic allocates memory within a non-volatile memory (NVM) buffer for the first group of memory cells of the multiple IC dice.

At operation 740, the processing logic, in response to determining that a subsequent IO write request is directed to a target address within the multiple IC dice that is less than an address of the location of the write pointer, transition a device mapping logic from a sequential IO state to a pre-fetch state associated with the first group of memory cells. The sequential IO state can be the sequential IO state 320 and the pre-fetch state can be the pre-fetch state 370 of the device mapping logic 300 of FIG. 3.

At operation 750, in furtherance of operation 740, the processing logic causes second data associated with the subsequent IO write request, and that has already been written from a beginning of the first group of memory cells, to be written to the allocated memory of the NVM buffer 150. Operation 750 thus enables data associated with the non-sequential IO write requests directed to the first group memory cells to be buffered in the memory device 130B. In this way, and in various embodiments, the kernel 128 is programmed with access to physical addresses of groups of memory cells of the multiple IC dice, where the kernel is to target sequential write operations and subsequent read operations to the physical addresses.

Figure 8:
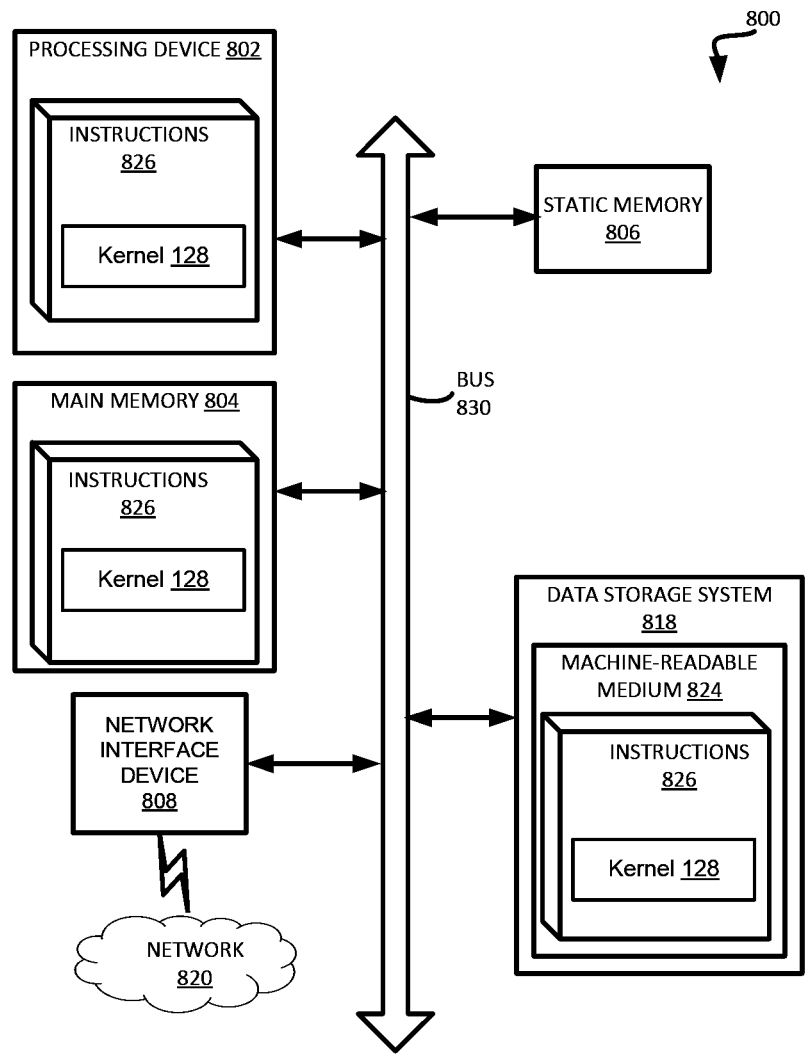
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIGS. 1A-1B) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to the kernel 128 of FIGS. 1A-1B. While the machine-readable storage medium 824 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
 a plurality of integrated circuit (IC) dice having memory cells; and
 a processing device coupled to the plurality of IC dice, the processing device to perform operations comprising:
  intercepting an input/output (IO) write request directed at the plurality of IC dice;
  causing a device mapping logic to enter an initial state associated with a first group of memory cells of the plurality of IC dice;
  storing, in a cache, a write pointer comprising a location within the first group of memory cells;
  transitioning the device mapping logic from the initial state to a sequential IO state; and
  in response to determining the IO write request is directed to the location of the write pointer, causing data associated with the IO write request to be sequentially written to the plurality of IC dice starting at the location of the write pointer.

2. The system of claim 1, wherein the operations being performed are executed by a kernel of an operating system on which a host file system is being executed, and wherein the device mapping logic comprises a state machine.

3. The system of claim 2, wherein the kernel is programmed with access to physical addresses of groups of memory cells of the plurality of IC dice, wherein the kernel is to target sequential write operations and subsequent read operations to the physical addresses.

4. The system of claim 1, further comprising:
 a non-volatile memory (NVM) buffer coupled to the processing device and to the plurality of IC dice; and
 wherein the operations further comprise:
  allocating memory within the NVM buffer for the first group of memory cells; and
  in response to a subsequent IO write request being directed to a second group of memory cells:
   transitioning the device mapping logic from the sequential IO state to a free state;
   freeing the allocated memory within the NVM buffer associated with the first group of memory cells; and
   transitioning the device mapping logic from the free state to a completed state with reference to memory allocation for the first group of memory cells.

5. The system of claim 1, further comprising:
 a non-volatile memory (NVM) buffer coupled to the processing device and to the plurality of IC dice; and
 wherein the operations further comprise:
  allocating memory within the NVM buffer for the first group of memory cells;
  updating the location of the write pointer upon completion of the IO write request; and
  in response to determining that a subsequent IO write request is directed to a target address within the plurality of IC dice that is greater than an address of the location of the write pointer:
   transitioning the device mapping logic from the sequential IO state to a non-sequential write state; and
   causing second data associated with the subsequent IO write request, and with IO write requests directed to a remainder of unwritten memory cells of the first group of memory cells, to be written to the allocated memory of the NVM buffer.

6. The system of claim 5, wherein the operations further comprise:
 storing, to a logical-to-physical (LTP) mapping data structure, an entry that maps the second data from a logical block address (LBA) to a memory chunk in the NVM buffer allocated to the first group of memory cells; and
 in response to a read request directed at the LBA address, returning data stored in the memory chunk of the NVM buffer.

7. The system of claim 5, wherein the operations further comprise:
 detecting a non-sequential IO write request being directed to a second group of memory cells; and
 in response to the detecting:
  transitioning the device mapping logic from the non-sequential write state to a reclaim state;
  causing the second data to be sequentially written to the first group of memory cells starting from the location of the write pointer;
  closing the first group of memory cells to further writing;
  transitioning the device mapping logic from the reclaim state to a free state; and
  freeing the allocated memory within the NVM buffer associated with the first group of memory cells.

8. The system of claim 1, further comprising:
 a non-volatile memory (NVM) buffer coupled to the processing device and to the plurality of IC dice; and
 wherein the operations further comprise:
  allocating memory within the NVM buffer for the first group of memory cells;
  updating the location of the write pointer upon completion of the IO write request; and
  in response to determining that a subsequent IO write request is directed to a target address within the plurality of IC dice that is less than an address of the location of the write pointer:
   transitioning the device mapping logic from the sequential IO state to a pre-fetch state;
   causing second data associated with the subsequent IO write request, and that has already been written from a beginning of the first group of memory cells, to be written to the allocated memory of the NVM buffer; and
   transitioning the device mapping logic from the pre-fetch state to a metadata state.

9. The system of claim 8, wherein the operations further comprise storing, to a logical-to-physical (LTP) mapping data structure, an entry that maps the second data from a logical block address (LB A) to a memory chunk in the NVM buffer allocated to the first group of memory cells.

10. The system of claim 8, wherein, within the metadata state, the operations further comprise:
 intercepting an additional IO write request to the first group of memory cells; and causing third data associated with the additional IO write request to be written to the allocated memory of the NVM buffer.

11. The system of claim 10, wherein the operations further comprise:
detecting a non-sequential IO write request being directed to a second group of memory cells; and
in response to the detecting:
transitioning the device mapping logic from the metadata state to a reclaim state;
causing the second data and the third data to be sequentially written to the first group of memory cells starting from the beginning of the first group of memory cells to the location of the write pointer;
closing the first group of memory cells to further writing;
transitioning the device mapping logic from the reclaim state to a free state; and
freeing the allocated memory within the NVM buffer associated with the first group of memory cells.

12. A method comprising:
intercepting an input/output (IO) write request associated with first data, the IO write request directed at a first group of memory cells of a plurality of integrated circuit (IC) dice having memory cells;
storing, by a processing device, in a cache, a write pointer comprising a location within the first group of memory cells;
allocating memory, by the processing device, within a non-volatile memory (NVM) buffer for the first group of memory cells of the plurality of IC dice; and
in response to determining that a subsequent IO write request is directed to a target address within the plurality of IC dice that is greater than an address of the location of the write pointer:
transitioning, by the processing device, a device mapping logic from a sequential IO state to a non-sequential write state associated with the first group of memory cells; and
causing, by the processing device, second data associated with the subsequent IO write request, and with IO write requests directed to a remainder of unwritten memory cells of the first group of memory cells, to be written to the allocated memory of the NVM buffer.

13. The method of claim 12, further comprising:
transitioning the device mapping logic from an initial state to the sequential IO state; and
causing, by the processing device, the first data of the IO write request to be sequentially written to the plurality of IC dice starting from the location of the write pointer.

14. The method of claim 12, further comprising:
storing, to a logical-to-physical (LTP) mapping data structure, an entry that maps the second data from a logical block address (LBA) to a memory chunk in the NVM buffer allocated to the first group of memory cells; and
in response to a read request directed at the LBA address, returning data stored in the memory chunk of the NVM buffer.

15. The method of claim 12, further comprising:
detecting a non-sequential IO write request being directed to a second group of memory cells; and
in response to the detecting:
transitioning the device mapping logic from the non-sequential write state to a reclaim state;
causing the second data to be sequentially written to the first group of memory cells starting from the location of the write pointer;
closing the first group of memory cells to further writing;
transitioning the device mapping logic from the reclaim state to a free state; and
freeing the allocated memory within the NVM buffer associated with the first group of memory cells.

16. A method comprising:
intercepting an input/output (IO) write request associated with first data, the IO write request directed at a first group of memory cells of a plurality of integrated circuit (IC) dice having memory cells;
storing, by a processing device in a cache, a write pointer comprising a location within the first group of memory cells;
allocating memory, by the processing device, within a non-volatile memory (NVM) buffer for the first group of memory cells of the plurality of IC dice; and
in response to determining that a subsequent IO write request is directed to a target address within the plurality of IC dice that is less than an address of the location of the write pointer:
transitioning a device mapping logic from a sequential IO state to a pre-fetch state associated with the first group of memory cells; and
causing second data associated with the subsequent IO write request, and that has already been written from a beginning of the first group of memory cells, to be written to the allocated memory of the NVM buffer.

17. The method of claim 16, further comprising:
transitioning the device mapping logic from an initial state to the sequential IO state; and
causing the first data of the IO write request to be sequentially written to the plurality of IC dice starting from the location of the write pointer.

18. The method of claim 16, further comprising:
storing, to a logical-to-physical (LTP) mapping data structure, an entry that maps the second data from a logical block address (LBA) to a memory chunk in the NVM buffer allocated to the first group of memory cells; and
in response to a read request directed at the LBA address, returning data stored in the memory chunk of the NVM buffer.

19. The method of claim 16, the method further comprising:
transitioning the device mapping logic from the pre-fetch state to a metadata state;
intercepting an additional IO write request to the first group of memory cells; and
causing third data associated with the additional IO write request to be written to the allocated memory of the NVM buffer.

20. The method of claim 19, further comprising:
detecting a non-sequential IO write request being directed to a second group of memory cells; and
in response to the detecting:
transitioning the device mapping logic from the metadata state to a reclaim state;
causing the second data and the third data to be sequentially written to the first group of memory cells starting from the beginning of the first group of memory cells to the location of the write pointer;
closing the first group of memory cells to further writing;

transitioning the device mapping logic from the reclaim state to a free state; and freeing the allocated memory within the NVM buffer associated with the first group of memory cells.

\* \* \* \* \*